United States Patent [19]
Blechschmidt et al.

[11] Patent Number: 5,562,378
[45] Date of Patent: Oct. 8, 1996

[54] LOCK WASHER

[75] Inventors: James L. Blechschmidt, Sycamore; James F. L. Blair, St. Charles, both of Ill.

[73] Assignee: Saint Switch, Inc., St. Charles, Ill.

[21] Appl. No.: 385,118

[22] Filed: Feb. 7, 1995

[51] Int. Cl.$^6$ ............................. F16B 39/10; F16B 39/32
[52] U.S. Cl. ............................ 411/121; 411/126; 411/160
[58] Field of Search ................................ 411/120, 121, 411/125, 126, 127, 160, 161

[56] References Cited

U.S. PATENT DOCUMENTS

| | | | |
|---|---|---|---|
| 809,044 | 1/1906 | Clark | 411/126 |
| 974,073 | 10/1910 | Kesberger | 411/126 |
| 1,349,404 | 8/1920 | Blake | 411/126 |
| 1,386,092 | 8/1921 | Cole | 441/126 |
| 1,891,563 | 12/1932 | Lillig | 411/126 |

FOREIGN PATENT DOCUMENTS

| | | | |
|---|---|---|---|
| 103645 | 6/1926 | Austria | 411/126 |

*Primary Examiner*—Neill R. Wilson
*Attorney, Agent, or Firm*—Wood, Phillips, VanSanten, Clark & Mortimer

[57] ABSTRACT

Corrosion, loosening and reusability problems incurred with prior art lock washers are eliminated in a lock washer having a planar washer body (10) formed of a thin sheet of resilient metal. A central aperture (18) is locate in the body (10) and is adapted to receive the shank (42) of a bolt to which a nut (40) is to be attached and locked. First and second lock tabs (14), (16) are formed in the body (10) radially outward of the central aperture (18) and are the sole lock tabs on the body (10). Each of the tabs (14), (16), has a radially inwardly facing, straight free edge (30) displaced to one side of the plane of the body (10). Each of the edges (30) is transverse to a radius of the body (10) and the lock tabs (14), (16) are angularly spaced by more than 90° and less than 180° such that when one free edge 30 is engaging the flat (50) of a nut (40), the other free edge (30) will be underlying a point (52) of the nut (40), between two adjacent flats (50) thereof.

5 Claims, 2 Drawing Sheets

LOCK WASHER

FIELD OF THE INVENTION

This invention relates to a lock washer, and more particularly, to a lock washer that will positively retain a nut, is not susceptible to corrosion problems, and which is readily releasable as well as reusable.

BACKGROUND OF THE INVENTION

Lock washers are commonly used in many different fields. As a consequence, there are large varieties of lock washer configurations that have evolved over the years for use in specific environments. Many have detriments of one sort or another associated with their use.

For example, it is not unusual to provide lock washers that include a sharp edge or point displaced from the body of the washer so as to dig in or gouge one or both of the nut that is being locked and the surface to which the nut is applied. While these types of lock washers work well for their intended purpose in many environments, they are not satisfactory where corrosion presents a problem. More particularly, where such lock washers are used after a protective coating has been applied to one or the other of the components to be joined, the gouging action provided by the sharp edge will always penetrate the coating if a good locked joint is to be obtained. As a result, the protective coating is no longer continuous and moisture or other corrosive substances may penetrate the joint with corrosion resulting.

Other lock washers include lock tabs which are displaced in the plane of the body of the washer and which have flat free edges which are adapted to abut a flat of the nut to be locked. See, for example, U.S. Pat. No. 1,349,404 issued Aug. 10, 1920 to Blake. In this construction, a plurality of lock tabs greater in number than the number of flats on the nut to be locked is provided and all project away from the plane of the washer to be located about the periphery of the nut. While these types of lock washers work well in terms of providing the desired locking function, it is difficult to loosen the lock nut and reuse of the lock washer may be a problem.

Typically, lock washers are made of a resilient metal and each of the lock tabs requires a force of 8–10 lbs. to depress the same back into the plane of the base of the washer. It is necessary to displace each tab back into the plane of the base of the washer to move it out of interfering relation with the flats of the nut if the nut is to be loosened.

When a number of the tabs are present as in Blake and other constructions, the total force involved may be 65–80 lbs. While such a force may be applied axially through the use of a socket wrench, where it is necessary to loosen the nut with a box end or open end wrench, the average user of such a tool is incapable of applying such a force over the lever arm represented by the length of the wrench, making removal difficult, if not impossible.

Furthermore, such constructions are extremely difficult to loosen with an open end wrench even if the force of the locked tabs can be overcome. Specifically, an open end wrench, by reason of its open ended geometry, will typically be incapable of depressing all of the lock tabs which in turn means that one or more lock tabs will spring into locking position in abutment with the flat of the nut, preventing its rotation.

If, in such a situation, rotation of the nut is forced, then the lock washer will be permanently distorted and cannot be reused.

French patent document 1,394,517 issued Feb. 22, 1965 to Bruhwiler, et al., which is the most pertinent prior art known to the applicant, provides a means of at least overcoming potential corrosion problems through the use of a locating tab on the body of the lock washer which may be received in a notch or recess in the surface to which the lock washer is applied to prevent the lock washer from rotating. However, Bruhwiler continues to employ a large number of lock tabs that require substantial force to displace into the plane of the washer body and which prevent ready loosening of the nut with a tool such as an open end wrench. Furthermore, the pointed lock tabs of Bruhwiler may hinder loosening of the nut in that they may have a tendency to dig into the sides of the loosening tool and hinder its rotation. When such occurs, to the extent the rotation is forced, then the lock tabs are permanently deformed and the Bruhwiler lock washer cannot be reused.

The present invention is directed to overcoming one or more of the above problems.

SUMMARY OF THE INVENTION

It is the principal object of the invention to provide a new and improved lock washer. More specifically, it is an object of the invention to provide a lock washer whose installation does not cause corrosion problems, which, when installed, does not require the application of undue force in order to depress locking tabs; which is reusable; which minimizes nut vibration and can be economically manufactured in low volume.

It is also an object of the invention to provide such a washer that is adapted to establish an electrical ground without requiring the grinding or polishing of the surface to which the washer is applied to assure good contact.

It is also an object of the invention to provide a lock washer that is susceptible to use in a large variety of environments, including in aircraft environments, and does not require the use of labor intensive and non-reusable safety wire. It is a further object to provide such a lock washer that, when installed, is free from sharp edges that could cause tearing of apparel that might come in contact therewith.

It is also an object of the invention to provide a lock washer of the type having locked tabs that will not stick or gouge into the underside of a loosening tool.

It is also an object of the invention to provide a lock washer that is such that if the clamping load is lost, the lock washer is such as to minimize nut motion to resist the effects of shock and vibration.

An exemplary embodiment of the invention achieves one or more of the above objects in a lock washer for use with a nut having n flats where n is an integer equal to 4, 5 or 6. The lock washer includes a planar washer body formed of a thin sheet of resilient metal. A central aperture is located in the body and is adapted to receive the shank of a bolt to which the nut is to be attached and locked. Lock tabs are formed in the body radially outward of the central aperture. The number of the lock tabs is less than n. Each of the lock tabs has a radially inward facing, straight free edge displaced to one side of the plane of the body. Each of the edges is transverse to a radius of the body. The lock tabs are angularly spaced by more than 90° and less than 180° and such that when one free edge is engaging the flat of a nut, another free edge will be at least partially underlying a point of the nut between two adjacent flats thereof. This offsetting feature biases a loosened nut against the remaining lock tab and thereby prevents rattling motion due to random vibrations.

In a preferred embodiment, a locating tab is located on the body.

In a preferred embodiment, the lock tabs are defined by generally L shaped notches in the washer body.

Preferably, the L shaped notches define respective points on the body opposite of the ends of the corresponding lock tabs and the points are displaced out of the plane of the body to the side thereof opposite the one side. The points may be used to establish electrical grounding.

In one embodiment of the invention, only two lock tabs are used.

In one embodiment of the invention, according to another facet thereof, there is provided a lock washer having a washer body with a central aperture as defined before. Lock tabs are formed in the body by L shaped cuts located radially outward of the central aperture and each of the tabs has a radially inward facing, straight free edge displaced to one side of the plane of the body. Each of such edges is transverse to a radius of the body.

The L shaped cuts further define flat ends on the lock tabs and points on the body opposite the flat ends. The points are displaced from the plane of the body to the side thereof opposite the one side.

Preferably, the cuts are defined by notches.

In a highly preferred embodiment, the number of the lock tabs is an integer of two or more and less than n.

In a highly preferred embodiment, the first and second lock tabs are spaced by about 135° and n is equal to 6.

Other objects and advantages will become apparent from the following specification taken in connection with the accompanying drawings.

DESCRIPTION OF THE PREFERRED EMBODIMENT

Figure 1:
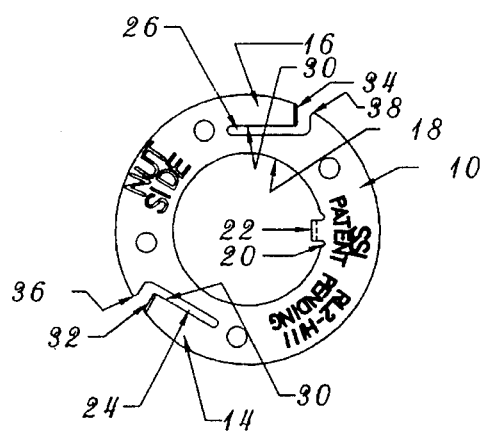
FIG. 1 is a plan view of one embodiment of a lock washer made according to the invention.
Figure 2:
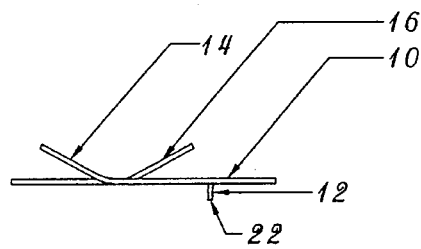
FIG. 2 is a side elevation of the lock washer.

Referring to FIGS. 1–4, inclusive, a first embodiment of the invention will be described in detail. The lock washer includes a ring like body, generally designated 10, formed from a thin sheet of resilient, metallic material. Preferably, tempered stainless steel sheet having a thickness of 0.013"–0.017" is employed. As best seen in FIG. 2, the body 10 is planar except for a locating tab 12 and two lock tabs 14 and 16.

The body 10 includes a central aperture 18 which is generally circular. The locating tab 12 is within the central aperture 18 and includes a short radially inwardly directed section 20 which terminates in a downwardly end 22.

As will be appreciated by those with ordinary skill in the art, the diameter of the central aperture 18 will be just slightly greater than the diameter of the shank of the bolt whose nut is to be locked. The locating tab 12 will be dimensioned so as to fit into an axial groove on the shank of the bolt so as to prevent the lock washer from rotating on the shank of the bolt.

First and second L-shaped notches 24 and 26 are formed in the body 10 to define the tabs 14 and 16 respectively. Notches are preferably employed as opposed to mere cuts for the purpose of relieving stresses where the tabs 14 and 16 join the remainder of the body 10.

The notches 24 and 26 are arranged so that each tab 14 and 16 includes a straight free edge 30. Each of the free edges 30 is located to be transverse, that is, at 90°, to a radius of the body 10, which radius may be considered as extending from the center of the central aperture 18.

The use of L shaped notches 24 and 26 as defining the tabs 14 and 16 result in the tabs 14 and 16 having non-pointed, flat ends 32 and 34 respectively. Because the ends 32 and 34 are flat, as opposed to pointed as in prior art constructions, they will not tend to gouge or penetrate the surface of a wrench or socket being rotated counter clockwise relative to the body 10.

In addition, the use of the L-shaped notches 24 and 26 results in points 36 and 38 being formed oppositely of the tabs 14 and 16 and their flat ends 32 and 34 respectively. In the embodiment shown in FIGS. 1 and 2, the points 36 and 38 are slightly rounded and remain within the plane of the body 10.

In contrast, and as best seen in FIG. 2, the lock tabs 14 and 16 are displaced upwardly from the plane of the body 10.

In a preferred embodiment, only the two tabs 14 and 16 are employed as lock tabs. That is to say, there are no other lock tabs other than the two illustrated. The free edges 30 are radially spaced from the center of the opening 18 a distance approximately equal to or just slightly greater than the distance from the center of the nut with which the washer is to be used to the nearest point on a flat of the nut.

It will be readily appreciated from FIG. 1 that the tabs 14 and 16 are not diametrically opposite one another. In a preferred embodiment, they are angularly spaced by more than 90°, but less than 180°, 135° being a particularly desired spacing if the nut with which the washer is to be used is a six sided nut. This same spacing can be advantageously used with a four sided nut, but if an extremely rare, five sided nut is used, a spacing other than 135° might be desirable. Nonetheless, spacing would remain at greater than 90° and less than 180°.

Figure 3:
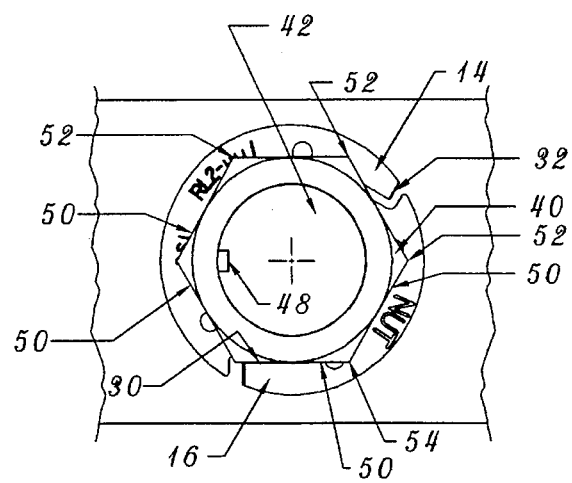
FIG. 3 is a plan view of the lock washer of FIGS. 1 and 2 as it would appear if installed.
Figure 4:
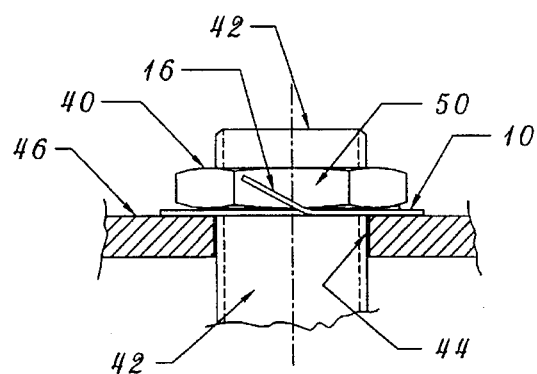
FIG. 4 is a side elevation of the installed lock washer with parts shown in section.

Turning to FIGS. 3 and 4 specifically, a nut, generally designated 40, has been applied to the shank, generally designated 42 of a bolt, which is impaled through an aperture 44 in a metal panel 46 or the like. The axial groove in the shank 42 referred to earlier can be seen at 48 in FIG. 3 and receives the locating tab 12. As can be seen, the nut 40 is a hex nut which is to say it has six, equally angularly spaced flats 50 as is well known. Adjacent flats 50 are separated by points 52. As can be appreciated from FIGS. 3 and 4, the lock tab 16, due to its inherent resilience and its being displaced from the plane of the body 10 has moved upwardly such that its free edge 30 is in substantial abutment with one of the flats 50 along a substantial portion of the length thereof. As a consequence, counterclockwise rotation of the nut 40 (assuming that the shank 42 has a right handed thread) is blocked by the lock tab 16 to prevent the same from loosening. At the same time, one of the points 52 overlies the tab 44 and in effect has deflected the same back into the plane of the body 10.

If the nut 40 is to be further tightened on the shank 42, the point 54 shown in FIG. 3 will cam the lock tab 16 back down into the plane of the body 10 to allow such tightening. At the same time, when the point 52 depressing the tab 14 passes past the end 32 thereof, the latter will spring up to abut one of the flats 50 and prevent reverse rotation unless, of course, held down by a tool or the like.

When it is desired to loosen the nut 50, a tool such as a socket wrench, an open end wrench or a box end wrench is applied to the nut and a small force applied to the same along the axis of the shank 42. Since, in a lock washer according to the invention, only the tab 16 or the tab 14, but not both, will be blocking one of the flats, it is only necessary to depress a single tab, which typically will require only application of 8–10 lbs. of force. This is in contrast with the 65–80 lbs. of force required in some prior art constructions and makes washers made according to the invention substantially easier to use in terms of loosening the nut.

Because so little axial force is required to depress one or the other of the tabs 14 or 16, it will be readily appreciated that there is no need to force the rotation of the nut 40 against either of the tabs to permanently deform the same. Consequently, a lock washer made according to the invention is readily reusable.

It will also be appreciated that the embodiment of FIGS. 1–4, through the use of a planar body 10, does not gouge or penetrate either the nut or the panel 46. As a consequence, corrosion producing sites are avoided. Furthermore, sharp points are avoided throughout.

In some instances, an electrical grounding connection between a bolt shank 42 and the panel 46 may be desired. In this instance, the embodiment illustrated in FIGS. 5–8, inclusive, may be used. Since the embodiment of FIGS. 5–8 shares many components in common with the embodiment just described, identical components will be given identical reference numerals and will not be redescribed in the interest of brevity.

Figure 5:
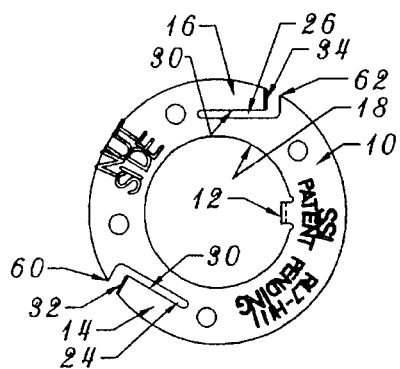
FIG. 5 is a view similar to FIG. 1 but of a modified embodiment of the invention.
Figure 6:
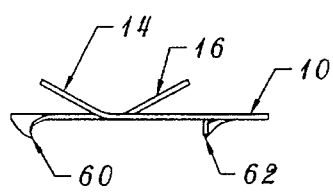
FIG. 6 is a view similar to FIG. 2 but of the modified embodiment.

The principal difference between the two embodiments is that the embodiment illustrated in FIGS. 5 and 6 utilizes sharp points 60 and 62 (in contrast to the rounded points 36, 38 in the embodiment of FIG. 1–4) where the L-shaped notches 24 and 26 emerge from the body 10 of the washer. As best seen in FIG. 6, these sharp points 60 and 62 are displaced from the plane of the body 10. The displacement is to the side of the plane of the body 10 opposite the side to which the tabs 14 and 16 are displaced.

Figure 7:
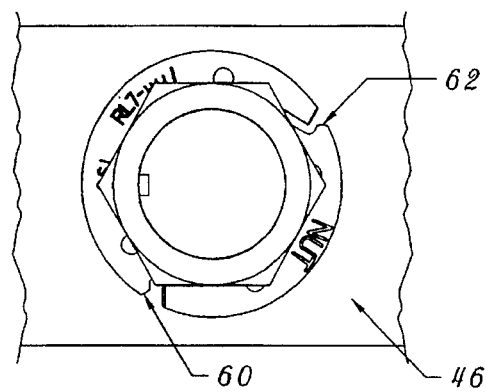
FIG. 7 is a view similar to FIG. 3 but of the modified embodiment.
Figure 8:
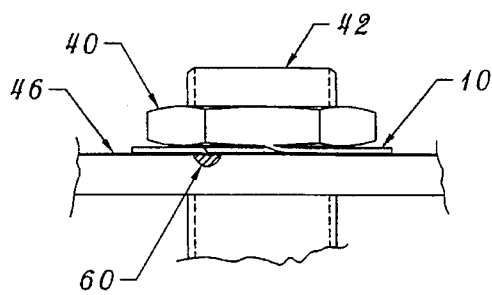
FIG. 8 is a view similar to FIG. 4 but of the modified embodiment.

As a consequence, when installed, the points 60 and 62 tend to appear slightly rounded as illustrated in FIG. 7 because they have gouged into and partially penetrated the surface of the panel 46 as shown in FIG. 8. Needless to say, such gauging will also penetrate any protective coating applied to the panel 46 and as a consequence, metal to metal contact is established for the purpose of establishing a good electrical ground connection between the shank 42 and the panel 46 via the nut 40, the washer body 10 and the points 60 and 62.

To the extent that the points 60 and 62 may create sites for potential corrosion, it should be noted that the unique use of only two of the lock tabs 14, 16 results in only two of the points 60 and 62, thereby minimizing the number of corrosion prone sites. This is readily tolerable in view of the fact that grinding the surface of the panel 46 abutted by the lock washer as required in prior art constructions to provide bare metal to metal contact is completely avoided.

From the foregoing, it will be readily appreciated that the lock washer made according to this invention is highly advantageous in that, in its preferred embodiment, completely eliminates the generation of corrosion sites, is readily and easily loosened intentionally through the use of standard tools such as open end wrenches, eliminates vibratory motion of the nut when clamp load is lost and is reusable. The absence of exposed edges or points is highly desirable to prevent safety hazards in many environments and the lock washer provides a positive lock without any need for safety wire or the like. With a simple modification to the preferred embodiment, ground points can be provided to complete an electrical circuit with minimal addition of potential corrosion sites.

We claim:

1. A lock washer for use with a nut having n flats, where n is an integer equal to 4, 5 or 6, said lock washer comprising;

a planar washer body;

said washer body being formed of a thin sheet of resilient metal;

a central aperture in said body and adapted to receive the shank of a bolt to which the nut is to be attached and locked;

first and second lock tabs formed in said body radially outward of said central aperture and being the sole lock tabs on said body;

each of said tabs having a radially inward facing, straight, free edge displaced to one side of the plane of said body; each said edge being transverse to a radius of said body;

said lock tabs being angularly spaced by more than 90° and less 180° and such that when one free edge is engaging the flat of a nut, the other free edge will be underlying a point of the nut between two adjacent flats thereof;

each of said lock tabs being defined by generally L-shaped notches in said body;

said L-shaped notches defining respective points on said body opposite the ends of the corresponding lock tabs, and said points being displaced out of the plane of said body to the side thereof opposite said one side; and a locating tab on said body.

2. A lock washer for use with a nut having n flats, where n is an integer equal to 4, 5 or 6, said lock washer comprising;

a planar washer body;

said washer body being formed of a thin sheet of resilient metal;

a central aperture in said body and adapted to receive the shank of a bolt to which the nut is to be attached and locked;

lock tabs formed in said body by L-shaped cuts located radially outward of said central aperture;

each of said tabs having a radially inward facing, straight, free edge displaced to one side of the plane of said body, each said edge being transverse to a radius of said body;

said L-shaped cuts further defining generally flat ends on said lock tabs and points on said body opposite said flat ends;

said points being displaced from the plane of said body to the side thereof opposite said one side.

3. The lock washer of claim 2 wherein said cuts are defined by notches.

4. The lock washer of claim 2 wherein the number of said lock tabs is in an integer of two or greater and less than n.

5. A lock washer for use with a nut having n flats, where n is an integer equal to 4, 5 or 6, said lock washer comprising;

a planar washer body;

said washer body being formed with a thin sheet of resilient metal;

a central aperture in said body and adapted to receive the shank of a bolt to which the nut is to be attached and locked;

lock tabs formed in said body radially outward of said central aperture and defined by generally L-shaped notches in said body;

the number of said lock tabs being less than n;

each of said tabs having a radially inward facing, straight free edge displaced to one side of the plane of said body, each said edge being transverse to a radius of said body;

said lock tabs being angularly spaced by more than 90° and less than 180° and such that when one free edge is engaging the flat of a nut, the other free edge will be at least partially underlying a point of the nut between two adjacent flats thereof;

said L-shaped notches defining respective points on said body opposite the ends of the corresponding lock tabs, and said points being displaced out of the plane of said body to the side thereof, opposite said one side; and a locating tab on said body.

\* \* \* \* \*